Oct. 14, 1958 H. H. STEGLICH 2,856,517

RADIO RECEIVER

Filed April 2, 1953

HERBERT H. STEGLICH
*INVENTOR.*

BY Francis W. Crotty

HIS ATTORNEY.

United States Patent Office 2,856,517

Patented Oct. 14, 1958

2,856,517

RADIO RECEIVER

Herbert H. Steglich, Wilmette, Ill., assignor to Zenith Radio Corporation, a corporation of Delaware Application April 2, 1953, Serial No. 346,345

1 Claim. (Cl. 250—14)

This invention relates to radio receivers and more particularly to radio receivers of the portable type adapted to be operated from an external alternating-current power source or, alternatively, from a self-contained direct-current battery supply.

For many years, portable radio receivers have been commercially available. Such receivers are generally provided with self-contained direct-current battery supplies to permit receiver operation where public utility electric power services are not conveniently available, and with a power cord fitted with a plug adapted for connection to an alternating-current power supply outlet when such electric power service is convenient. Since the power supply circuits of the receiver for alternating-current and direct-current operation are different, it is necessary to provide a changeover switch arrangement for selectively connecting the receiver for A. C. or battery operation. In one such arrangement which has found widespread commercial acceptance, the receiver chassis is provided with a receptacle simulating an alternating-current power outlet, and the power supply changeover switch is arranged to be mechanically actuated by insertion of the power cord plug in this receptacle; thus, the receiver power plug must be inserted either into an alternating current mains outlet for A. C. operation or into the chassis receptacle to actuate the power supply changeover switch if battery operation is desired. Such an arrangement is particularly described and claimed in United States Patent 2,229,729—Kurt Emde, issued January 28, 1941, for "Power Supply System," and assigned to the same assignee as the present application.

In receivers incorporating power changeover switch arrangements of the type described in the Emde patent, the receptacle associated with the changeover switch is concealed within the cabinet. To permit access to this receptacle, it has been customary to provide a panel which may be hinged open or removed to permit the power plug to be inserted into the switch-operating receptacle, and it has also been customary to provide a pair of brackets around which the power cord may be looped when the receiver is conditioned for battery operation. Thus, in receivers of this type, changeover between A. C. and battery operation is time consuming since the cabinet must be opened and the power cord either coiled or uncoiled when changing from one type of operation to the other.

It is a primary object of the invention to provide a new and improved portable radio receiver, adapted to be operated either from an external alternating-current power source or from a self-contained direct-current battery supply, in which access to the interior of the cabinet is not required in order to effect changeover from one type of operation to the other.

It is a further object of the invention to provide such a new and improved portable radio receiver without imposing any material limitation on the application of ornamental design techniques to the receiver cabinet.

The invention concerns itself generally with a portable cabinet having side, front and rear exterior walls, for accommodating a wave-signal receiver of the type which is operative in response to alternating current obtained from an external source or from a direct current battery within contained. When operated from an external source a male plug fitted at one end of a power cord which is coupled at its other end to the receiver, is adapted to matingly engage a female plug coupled to the external source. When coupled to the within contained battery source the male plug matingly engages a female switch receptacle disposed within the cabinet and facing the rear wall thereof. The female plug receptacle is spaced behind the cabinet rear wall by a predetermined distance greater than the distance that the male plug extends behind the power cord. In accordance with the invention, the wave-signal receiver cabinet comprises means in its rear wall for defining an opening therethrough disposed in alignment with the female switch receptacle and of such size as to accommodate the passage therethrough of the male plug. A member is disposed between said opening and said female switch receptacle which member defines a recess bottomed by the switch receptacle. This member includes means defining an aperture of a size to accommodate the passage therethrough of the power cord but blocking the passage therethrough of the male plug carried at the end of the power cord. The power cord is wound around a spring-biased takeup reel enclosed within the cabinet interior and passes through the aperture in the defining member.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements and in which:

Figure 1:
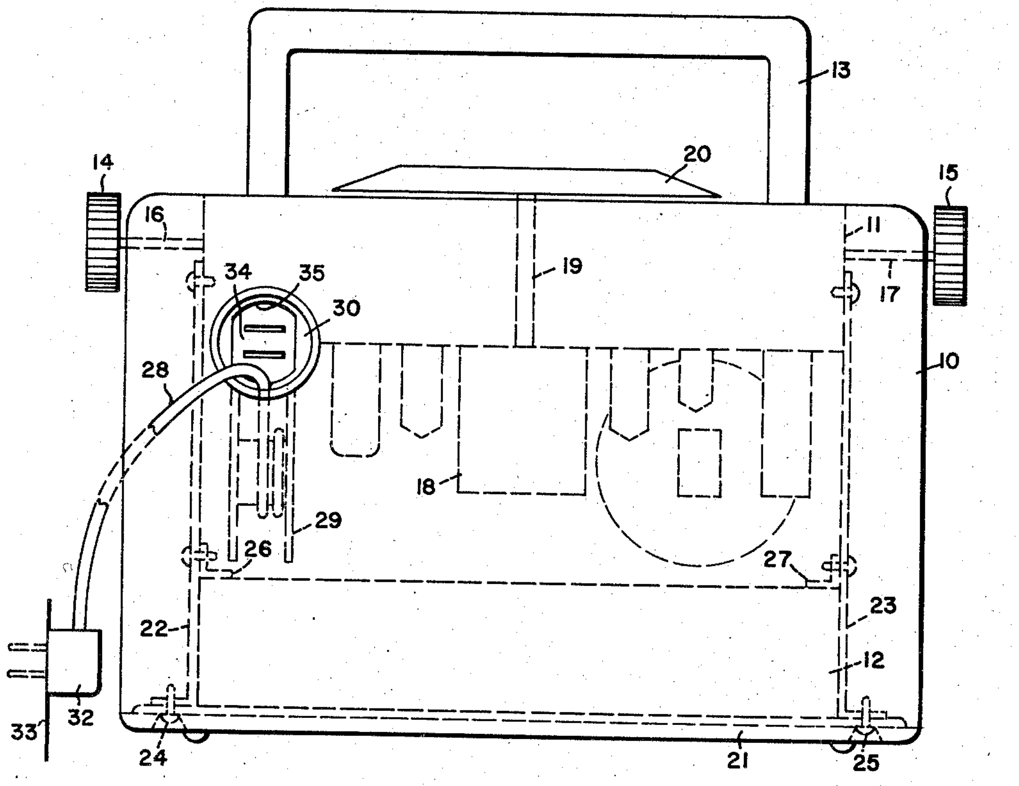
Figure 1 is a back view of a portable radio receiver constructed in accordance with the invention, with the chassis and battery supply inside the cabinet being indicated in dotted outline.

The portable radio receiver of Figure 1 comprises a cabinet 10 housing a chassis 11 and a direct-current battery supply 12 and provided with a carrying handle 13. Chassis 11 is mounted in inverted or upside-down position within cabinet 10 and is secured to the top of the cabinet by any suitable means such as conventional mounting bolts (not shown). Control knobs 14 and 15 are mounted on control shafts 16 and 17 respectively extending from chassis 11 through the side walls of the cabinet and may be employed, for example, to control the volume and tone of the sound reproduction. The tuning element of the receiver, which may comprise a conventional multi-section variable air condenser 18, is provided with a control shaft 19 extending through the chassis and the top of the cabinet, and a calibrated control member or dial 20 is secured to the end of tuning shaft 19. Various components of the receiver, such as electron tubes, electrolytic condensers, intermediate-frequency transformers, and the loudspeaker, are indicated as depending from the chassis. The cabinet is also provided with a bottom plate 21 which is secured to brackets 22 and 23 anchored to chassis 11 in any suitable manner, as for example by mounting screws 24 and 25, and brackets 22 and 23 may be provided with respective shelf brackets on stops 26 and 27 to retain direct-current battery supply 12 in position within the cabinet and to prevent interference of the battery with the tubes and other components depending from chassis 11. The construction of the receiver chassis, and the arrangement of the chassis and the battery supply within cabinet 10, may be varied as desired and constitute no part of the present invention.

Chassis 11 is provided with a power cord 28 electrically connected to the power supply circuits of the receiver, which may comprise a rectifier and filter combination for providing unidirectional energizing current for the filaments and plates of the receiving, detecting and amplifying tubes. Power cord 28 is coiled or wound on a reel 29 mounted on chassis 11, and reel 29 is spring-biased in any suitable well-known manner, tending to keep the power cord coiled on the reel but permitting the cord to be uncoiled from the reel to any desired length. For example, Figure 1, reel 29 is spring-biased for rotation in a counterclockwise direction as viewed from the right-hand side of the drawing.

The back wall of cabinet 10 is provided with a generally cylindrical recess 30 which may conveniently be formed by placing an insert in a suitable aperture provided in the cabinet back. Power cord 28 is passed through a first opening 31 in the generally cylindrical wall of recess 30, and the extremity of power cord 28 is provided with a conventional plug 32 adapted for connection to a standard alternating-current power outlet, illustrated schematically at 33.

Chassis 11 is also provided with a receptacle 34 adapted to receive plug 32 at the end of power cord 28. Receptacle 34 is mounted on chassis 11 in juxtaposition with a second opening 35 in the cabinet wall, through the bottom of recess 30, to permit access of plug 32 to receptacle 34 from outside cabinet 10. A power changeover switch, suitably connected to the circuits of the receiver unit, of the type adapted to be mechanically actuated by insertion of a power plug such as plug 32 is associated with receptacle 34, as indicated in dotted lines in Figure 3; reference may be made to the above-identified Emde patent for a specific disclosure of a plug-actuated power changeover switch arrangement of this type.

For A. C. operation of the receiver of Figure 1, power cord 28 is withdrawn against the spring bias applied to reel 29 to a sufficient extent to permit insertion of plug 32 in the nearest available alternating current power outlet. When plug 32 is disconnected from power outlet 33, and released, cord 28 is coiled on reel 29 through the spring-biasing action associated therewith until power plug 32 engages the cylindrical wall of recess 30 preventing further retraction of the power cord by the spring-biased reel. In this position, power plug 32 is conveniently retained within recess 30, and it is no longer necessary to open or remove a panel of the cabinet and coil the power cord manually about a pair of brackets or prongs provided for that purpose.

Figure 3:
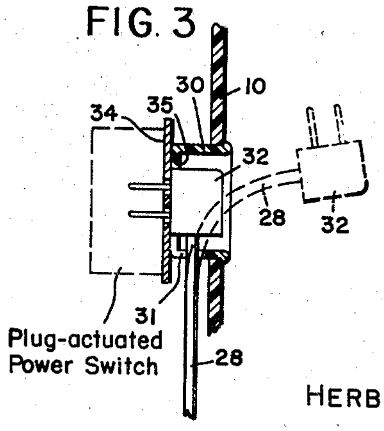
Figure 3 is a fragmentary detailed view, partly in cross-section and partly schematic, illustrating the power switching operation in accordance with the present invention.

When it is desired to condition the receiver for direct-current operation, by connection to the battery supply 12, power plug 32 is merely inserted in receptacle 34, as best illustrated in Figure 3. The insertion of plug 32 in receptacle 34 mechanically actuates the power changeover switch and connects the battery supply to energize the receiving and amplifying circuits. This operation is also easily and conveniently performed from outside the cabinet, without necessitating the opening or removing of a panel or bottom plate and the manual uncoiling of the power cord.

For subsequent operation of the receiver from an alternating-current supply main, plug 32 is merely withdrawn from receptacle 34 and the power cord is extended to the required extent and inserted in a convenient A. C. outlet, as previously explained.

Recess 30 is preferably at least as deep as the height of the power plug 32, to permit the plug to be entirely accommodated within the recess whether inserted in receptacle 34 or not, so that no portion of the plug protrudes from the recess. The diameter of the recess is preferably small to make the power switch receptacle and the power plug as unobtrusive as possible.

Figure 2:
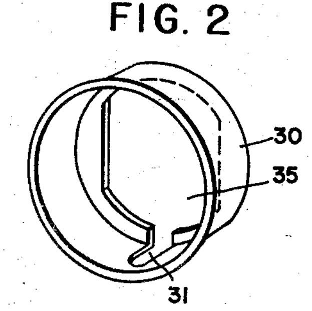
Figure 2 is a perspective detailed view of a part of the receiver of Figure 1.

An additional advantage of the invention resides in the elimination of hinged or removable panels, permitting the major portion of the cabinet to be molded in a single piece, it only being necessary to provide a removable bottom plate to permit replacement of the battery supply when exhausted. To this end, it may be desirable to form recess 30 as a separate element, either of plastic or metal or other material and preferably of a color matching cabinet 10, for snug insertion in a suitably dimensioned aperture in the wall of the cabinet molding. Such an insert is shown in perspective view in Figure 2, with the first and second openings 31 and 35 merged to permit the power plug to be drawn through the insert in mass production assembly of the receiver. Once the assembly is completed, there is no occasion for withdrawing the power cord through the opening in the insert, and the second opening 35 is effectively closed by receptacle 34, so that power plug 32 is restrained from being retracted within the confines of the cabinet.

The operation of the invention may perhaps most readily be observed by reference to Figure 3, in which the power plug is shown in complete outline in a position inserted in receptacle 34 associated with the plug-actuated power changeover switch, and in dotted outline in a position partially withdrawn for connection to an alternating-power supply outlet.

While a particular embodiment of the present invention has been shown and described, it is apparent that various changes and modifications may be made, and it is therefore contemplated in the appended claim to cover all such changes and modifications as fall within the true spirit and scope of the invention.

I claim:

A portable cabinet having side, front, and rear exterior walls enclosing a wave-signal receiver operative in response to alternating current from an external source only when a male plug, fitted on one end of a power cord coupled at its other end to said receiver, matingly engages a female plug coupled to said external source and operative in response to direct current from a battery source disposed within said cabinet only when said male plug matingly engages a female switch receptacle disposed within said cabinet facing said rear wall and spaced therebehind by a predetermined distance greater than the distance said male plug extends beyond said power cord, said cabinet comprising: means in said rear wall defining an opening therethrough disposed in alignment with said switch receptacle and of a size accommodating passage of said male plug; a member disposed between said opening and said switch receptacle to define a recess bottomed by the switch receptacle; means in said member defining an aperture of a size accommodating passage of said power cord but blocking passage of said male plug therethrough into the interior of said cabinet; and a spring-biased take-up reel enclosed within said cabinet interior, said power cord being wound upon said reel and passing therefrom through said aperture.

References Cited in the file of this patent

UNITED STATES PATENTS

| | | |
|---|---|---|
| 2,229,729 | Emde | Jan. 28, 1941 |
| 2,487,601 | Schnoor et al. | Nov. 8, 1949 |

FOREIGN PATENTS

| | | |
|---|---|---|
| 431,244 | Great Britain | July 3, 1935 |
| 631,758 | Great Britain | Nov. 9, 1949 |